United States Patent [19]

Urui et al.

[11] Patent Number: 4,635,253
[45] Date of Patent: Jan. 6, 1987

[54] EXCHANGE SYSTEM INCLUDING PLURAL TERMINALS FOR VOICE AND DATA TRANSMISSION

[75] Inventors: Kiyoshi Urui, Yokohama; Kiyoshi Ishikawa, Yokosuka; Michiaki Okano, Yokohama, all of Japan

[73] Assignee: Kabushiki Kaisha Toshiba, Kawasaki, Japan

[21] Appl. No.: 637,832

[22] Filed: Aug. 6, 1984

[30] Foreign Application Priority Data

Aug. 12, 1983 [JP] Japan ................................ 58-147353

[51] Int. Cl.⁴ ......................................... H04Q 11/04
[52] U.S. Cl. ......................................... 370/67; 370/84
[58] Field of Search ........................ 370/67, 58, 82, 83, 370/84, 95, 85, 66

[56] References Cited

U.S. PATENT DOCUMENTS 3,535,457 10/1970 Poschenrieder ...................... 370/83
3,632,882 1/1972 Ciecierski et al. ..................... 370/83
3,806,654 4/1974 Dooley et al. ........................ 370/83
4,530,093 7/1985 Akram et al. ........................ 370/58

Primary Examiner—Douglas W. Olms
Attorney, Agent, or Firm—Oblon, Fisher, Spivak, McClelland & Maier

[57] ABSTRACT

An exchange system includes a plurality of terminal devices, a plurality of interface devices for transmitting signal data and control data among the terminal devices and the interface devices on the basis of a two way bidirectional burst transmission system, and a control circuit which assigns a time slot to a PCM highway according to control data transmitted through a control highway from one of the interface devices, and transmits within the assigned time slot the signal data through the PCM highway to a selected one of the interface devices, through the PCM highway. Each of the terminal circuits generates 2-bit mode data representing the type of the terminal device. The control circuit assigns one or two time slots to the PCM highway according to the mode data.

3 Claims, 10 Drawing Figures

FIG. 2A
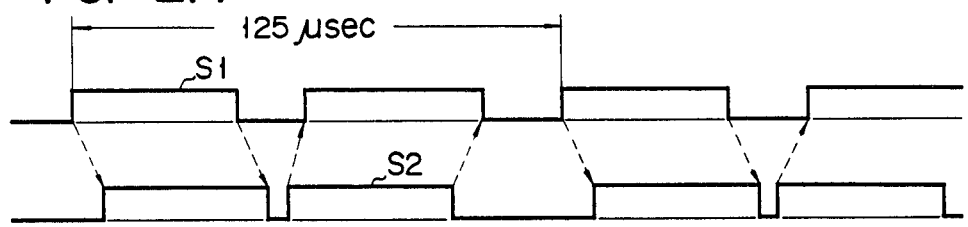
FIG. 2B
FIG. 5A
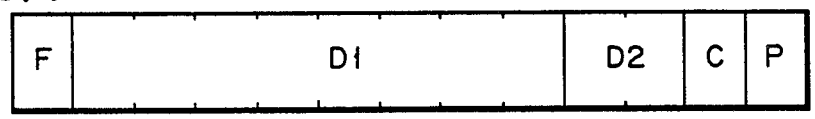
FIG. 5B
FIG. 6
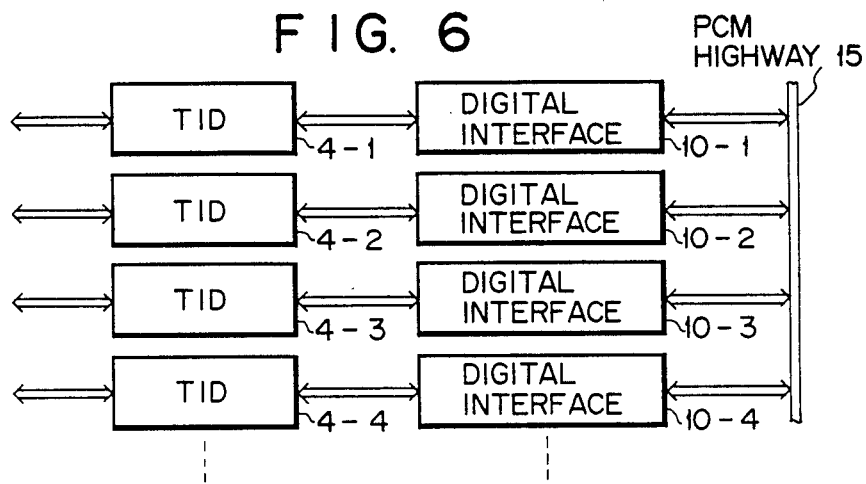
FIG. 7A
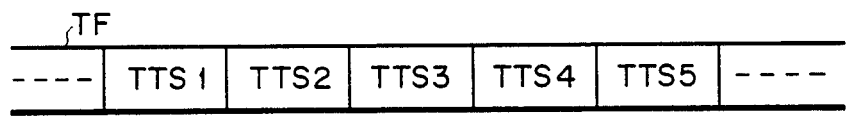
FIG. 7B

EXCHANGE SYSTEM INCLUDING PLURAL TERMINALS FOR VOICE AND DATA TRANSMISSION

BACKGROUND OF THE INVENTION

The present invention relates to an exchange system of which the signal transfer is based on a two-wire bidirectional burst transfer system.

With recent remarkable progress of digital signal processing technology, there has been developed and put into practice an exchange system in which a digital transfer of signal is performed between an exhange and various types of terminal devices. Of the digital transfer systems, the two-wire bidirectional burst transfer system, a called ping-pong transfer system, has attracted a great attention because of the following two advantageous features. The digital transfer allows the existing analog two-way telephone lines to be available, as they are intact, for the concurrent transfer of voice and data. It is relatively easy to take a synchronization in the signal transfer. If employing this type of the transfer system for exchange system configuration, an advanced exchange system can easily be realized by connecting to an exchange not only standard telephone exchanges but also various types of data terminal devices capable of the concurrent transfer of voice and data. In the exchange system using such terminal devices, it is necessary to previously set in a memory of an exchange the information representing what types of terminal devices are respectively connected to interface circuits or subscriber's circuits, by using a maintenance program, for example. For this reason, it was needed to change the set information every time the terminal device is changed from one to another. To cope with frequent situations where the exchange must concurrently handle both voice and data, an approach assigns two time slots to each of the interface circuits, one for voice exchange and the other for data exchange. According to this approach, the two time slots are assigned to even the terminal devices handling only voice or data. In this case, either of the two time slots is void in use, resulting in deterioration of the transfer efficiency of voice and data.

SUMMARY OF THE INVENTION

Accordingly, an object of the present invention is to provide an exchange system which can easily and efficiently execute an exchange control among various types of terminal devices.

According to the present invention, there is provided an exchange system comprising a plurality of interface circuits, a plurality of terminal devices coupled with the plurality of the interface circuits and for transmitting signal data and control data in a predetermined format between the interface circuts and the terminal devices, a control highway for transmitting the control data, a PCM highway for transmitting the signal data, and control device which assigns to the PCM highway a time slot with a length determined by mode data generated from one of the terminal device and transmitted through a corresponding one of the interface circuits and the control highway, in order to transmit signal data from one of the terminal devices, and transmits within the assigned time slot the data part of the signal data with the predetermined format, which is specified by the mode data, through the PCM highway to one of the interface circuits which is selected according to the control data.

In the present invention, assignment of the time slot to the PCM highway is executed according to the mode data representing the type of the terminal device. Therefore, there is eliminated unavoidable use of void time slots, and hence data transmission through the PCM highway is made remarkably effective.

With such an arrangement, the time slot assignment to the PCM highway is performed according to mode data representing the types of terminal devices. Therefore, only necessary time slots are assinged to the PCM highway, thus improving the data transmission efficiency on the data highway.

BRIEF DESCRIPTION OF THE DRAWINGS

FIGS. 2A and 2B show signal waveforms diagrammatically illustrating a general data tranfer operation of the exchange system shown in FIG. 1;

FIGS. 5A and 5B show respectively a data format of signal data generated by the terminal interface device, and control data;

FIG. 6 is a wiring diagram illustrating different types of terminal interface devices and digital interface circuits; and FIGS. 7A and 7B show respectively transmission and receiving frames representing time slots assigned to PCM highway when the terminal interface devices of FIG. 6 receive and transmit data.

DETAILED DESCRIPTION OF THE PREFERRED EMBODIMENTS

Figure 1:
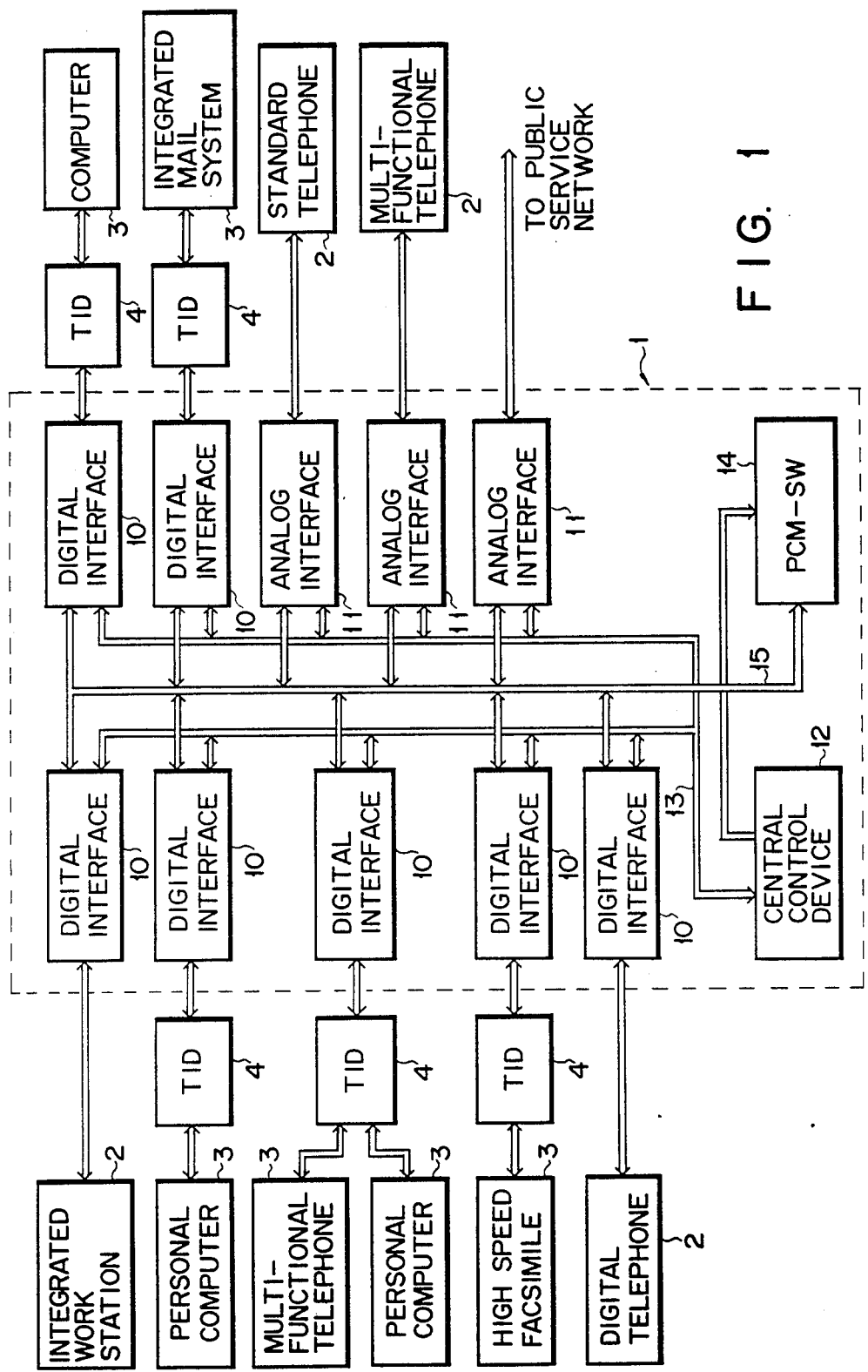
FIG. 1 is a block diagram of an exchange system which is an embodiment of the present invention.

Reference is made to FIG. 1 illustrating in block form an embodiment of an exchange system according to the present invention. The exchange system, configured as shown in FIG. 1, is comprised of a PCM exchange 1, various types of terminal devices 2 directly connected to the PCM exchange 1, various types of terminal devices 3 connected through terminal interface devices 4 to the PCM exchange 1. The terminal devices 2 contain an integrated work station (or a computerphone), a digital telephone, a standard telephone, a multi-functional telephone, and the like. The terminal devices 3 contain personal computers, a multi-funcitonal telephone, a high speed facsimile, an integrated mail system, and the like.

The PCM exchange 1 is comprised of digital interface circuits 10 respectively connected to the terminal devices 2 and the terminal interface devices 4, analog interface circuits 11 respectively coupled with the terminal devices 2 and a public service network, a central control device 12 connected through a control highway 13 of the two way type to the digital and analog interface circuits 10 and 11, and a PCM switching circuit 14 connected to a PCM highway 15 to the digital and analog interface circuits 10 and 11. The PCM switching circuit 14 contains a time slot conversion memory for sequentially storing data transferred through, for example, the PCM highway 15 in a time divisional manner. The central control device 12 controls the operations of the digital and analog integrated circuits 10 and 11 in response to control signals transferred from the digital and analog integrated circuits 10 and 11 in a time divisional manner. The central control device 12 also controls the PCM switching circuit 14 to selectively assign time slots of the PCM highway 15 to the digital and analog integrated circuits 10 and 11.

The terminal devices 2 and 3 to be coupled with the PCM exchange 1 are selected according to specifications as specified by users. For example, an integrated work station capable of concurrently transferring voice and data, which forms one of the terminal devices 2, is directly coupled with one of the digital interface circuits 10 in the PCM exchange 1. A high speed facsimile 3 for data transmission is coupled with one of the digital interface circuits 10 of the PCM exchange 1 through one of the terminal interface devices 4 as of the X.21 type. Similarly, a computer as one of the terminal devices 3 is connected to one of the digital interface circuits 10, through an X.20 type interface as one of the terminal interface devices 4. A personal computer is connected to one of the digital interface circuits 10, through a V.24 type interface forming one of the terminal devices 3. A standard telephone as one of the terminal devices 2 is connected to one of the analog interface circuits 11.

The type of the terminal interface devices 4 are specified according to the CCITT recommendation. For example, the types of V.24 and X.20 indicate asynchronous type interfaces. Types of V.35 and X.21 indicate synchronous type interface for the transfer of 48 Kbps or less data. The synchronous and asynchronous type interfaces respectively provide interfaces for the transmission of various signals between the PCM exchange 1 and the synchrous and asynchronous terminal devices. Those signals are used in those terminal devices and are, for example, transmitted data, received data, data set ready, data channel received line signal detector, calling indicator, request to send, ready for sending, data terminal ready. Further, the terminal interface devices 4 are applicable for the interface devices for use with the terminal devices such as telephone sets which handle voice interface signals.

Each of the terminal devices 2 contains the interface circuit constructed like the terminal interface device 4.

Between the PCM exchange 1 and the terminal interface devices 4, signals formatted in a predetermined fashion are transmitted in the two way bidirectional burst transmission mode. For effecting this signal transmission, the PCM exchange 1 generates a signal S1 as shown in FIG. 2A, for example, and transmits it to the terminal interface devices 4, as shown in FIG. 2B. After a predetermined time lapses, the terminal device 3 produces a signal S2 as shown in FIG. 2B, and sends it to the PCM exchange 1. In this embodiment, a period of time from generation of a signal S1 by the PCM exchange 1 till generation of the next signal S1 is set at 125 μs. The signals S1 and S2 are in the form of diphase signal, for example.

Figure 3:
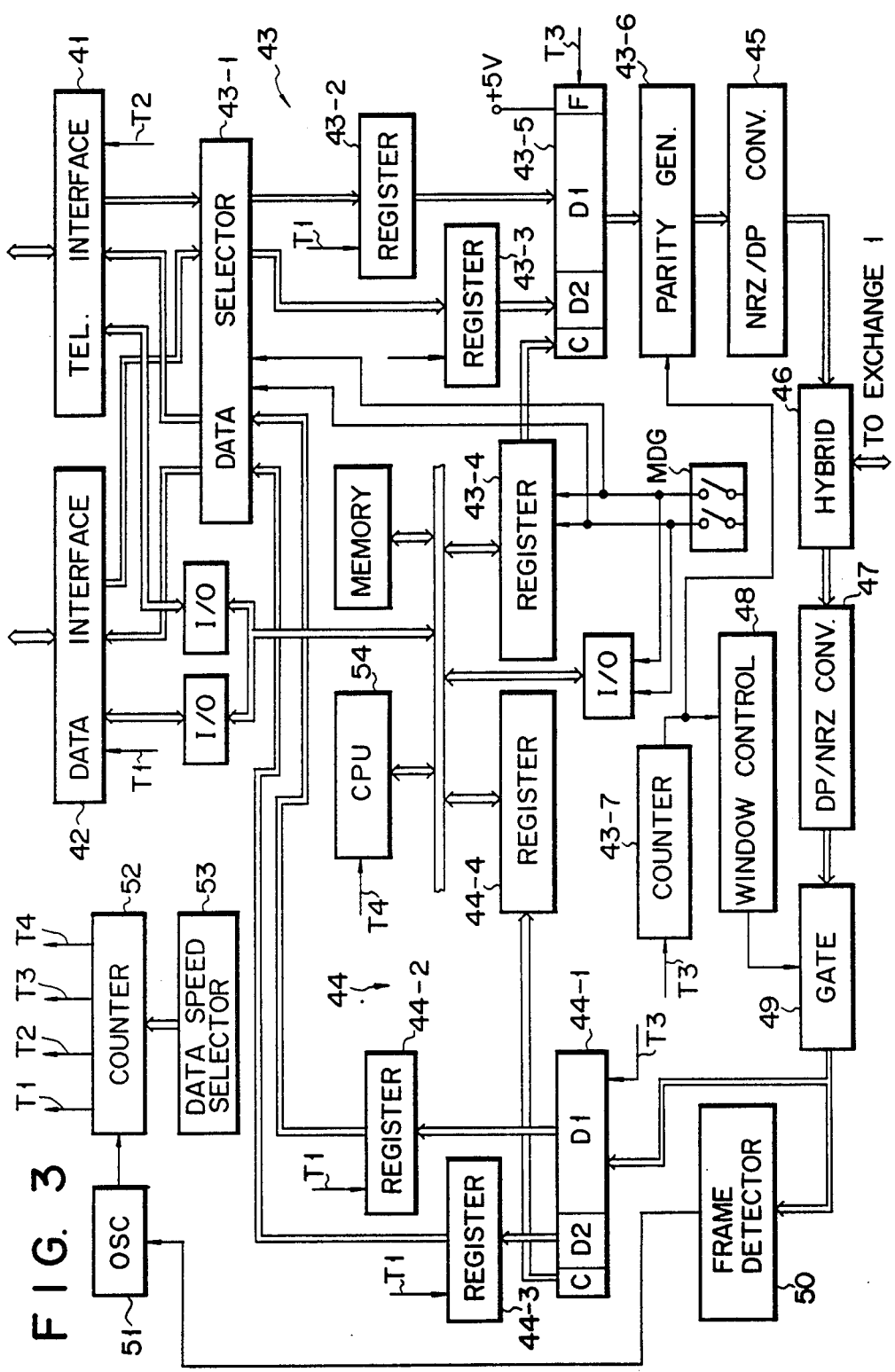
FIG. 3 is a block diagram of one of terminal interface devices used in the circuit shown in FIG. 1.

FIG. 3 shows in block form one of the terminal interface devices 4. The terminal interface device is comprised of a telephone terminal interface 41, a data terminal interface 42, a mode data generator MDG, a data transmitter 43, and a data receiver 44. The telephone terminal interface 41 is coupled with a telephone terminal device for voice communications. The data terminal interface 42 is coupled with a data terminal device for data communications. The data transmitter 43 sends the data corresponding to the data from the terminal interfaces 41 and 42 according to the mode data from the mode data generator MDG. The data receiver 44 supplies the received data to the terminal interfaces 41 and 42 according to the mode data derived from the mode data generator MDG. To be more specific, the data transmitter 43 is composed of a part of a data selector 43-1, a control data register 43-4, a multiplexer 43-5, a parity generator 43-6, and a counter 43-7. The part of the data selector 43-1 selectively supplies the data transmitted from the interfaces 41 and 42 to the D1 and D2 registers 43-2 and 43-3 according to the mode data from the mode data generator MDG. The control data register 43-4 is for storing control data of 12 bits including the mode data of 2 bits derived from the mode data generator MDG. The multiplexer 43-5 receives in parallel the data from the registers 43-2 to 43-4, and generates a frame bit F, data D1, data D2 and a control bit C in this order, as will be given later. The counter 43-7 counts the drive pulses applied to the multiplexer 43-5.

The data receiver 44 is comprised of a demultiplexer 44-1 and part of the data selector 43-1. The demultiplexer 44-1 is used for supplying data D1, data D2 and a control bit C of the received data to a D1 register 44-2, a D2 register 44-3 and a control data register 44-4. The part of the data selector 43-1 is used for selectively supplying the data from the D1 and D2 registers 44-2 and 44-3 according to the mode data from the mode data generator MDG. An NRZ signal on the voice and data from the data transmitter 43 is converted into a diphase signal by an NRZ/diphase converter 45, and then is transferred to the PCM exchange 1, through a hybrid circuit 46. The diphase signal transmitted from the PCM exchange 1 is applied through the hybrid circuit 46 to a diphase/NRZ converter 47 where it is converted into an NRZ signal. The NRZ signal from the diphase/NRZ converter 47 is supplied to the demultiplexer 44-1 of the data receiver 44 and to a frame detector 50, through a window gate circuit 49. The window gate circuit 49 is enabled by a control signal generated by a window control circuit 48 for about one frame period after a predetermined period of time from generation of the data with a parity bit by the parity generator 43-6. The frame detector 50 produces a synchronization pulse when it detects a frame signal contained in the NRZ signal supplied through the window gate circuit 49. In synchronism with the synchronization pulse generated, a clock generator 51 produces a clock signal. A counter 52 counts the clock pulse generated by the clock generator 51 to produce a drive pulse T1 of 48 KHz, 9.6 KHz, 4.8 KHz or 2.4 KHz, a drive pulse T2 of 64 KHz, a drive pulse T3 of 256 KHz, and a drive pulse T4 of 2 MHz. The frequency of each of those drive pulses depends on the data derived from a speed selector 53. The drive pulse T1 is supplied to the data terminal interface 42, and registers 43-2, 43-3, 44-2 and 44-3. The drive pulse T2 is supplied, to the telephone terminal interface 41. The drive pulse T3 is supplied, to the multiplexer 43-5, the demultiplexer 44-1 and the counter 43-7. A CPU 54 responds to the drive pulse T4 from the counter 52 to control the operations of the telephone terminal interface 41, the data terminal interface 42, and the registers 43-4 and 44-4.

The mode data generator MDG is designed in the following. When an asynchronous data terminal is coupled with the data terminal interface 42, the mode data generator MDG produces mode data "00". When a synchronous data terminal device is coupled with the telephone terminal interface 41, it produces mode data "01". When a voice terminal device is coupled with the telephone terminal interface 41, it produces mode data "10". When the asynchronous data terminal device and the voice terminal device are respectively coupled with the interfaces 41 and 42, it produces mode data "11".

Figure 4:
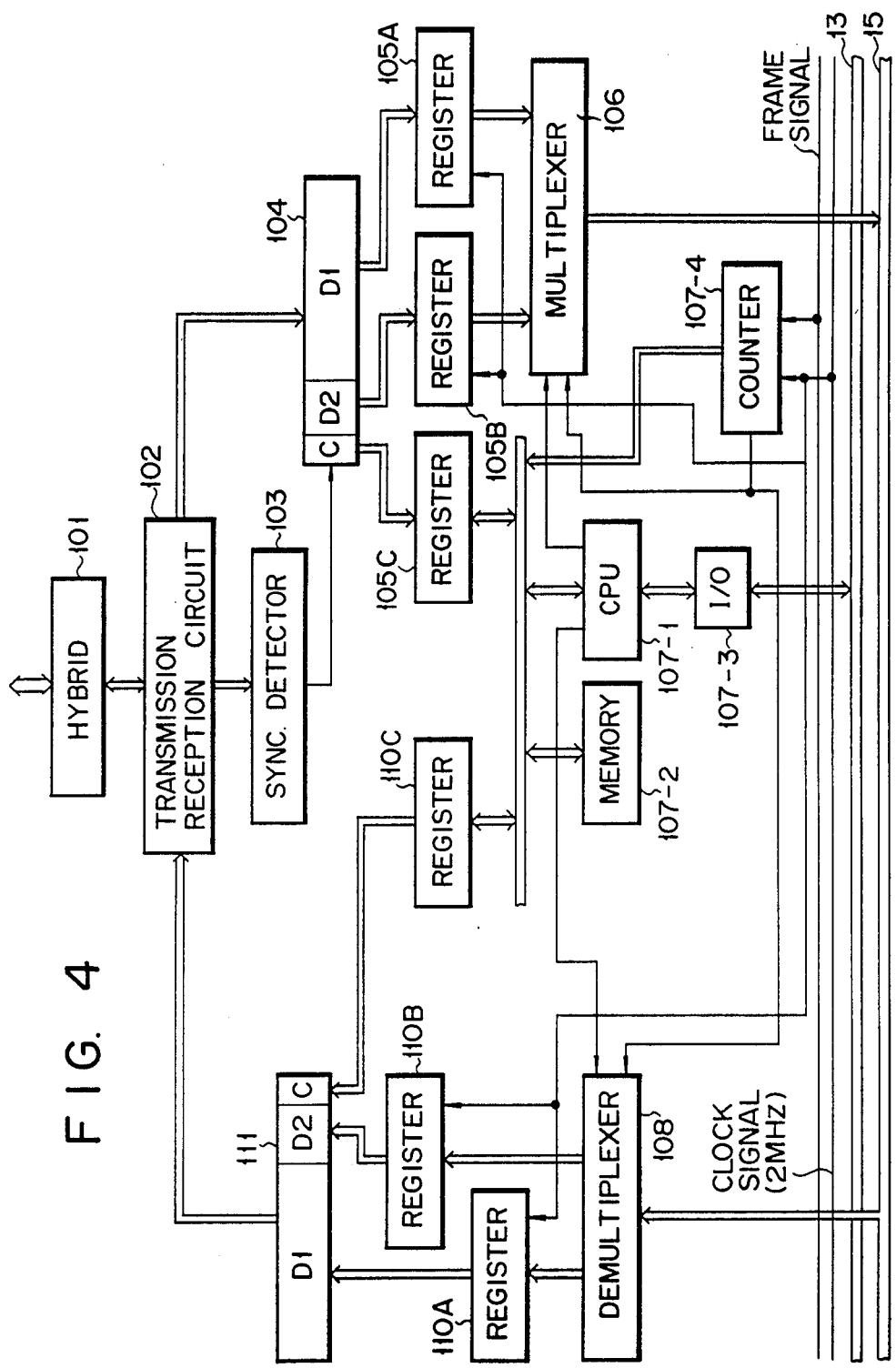
FIG. 4 is a block diagram of one of digital interface circuits used in the FIG. 1 circuit.

Turning now FIG. 4, there is shown in block form one of the digital interface circuits 10 in the PCM exchange 1. The digital interface circuit 10 is made up of a hybrid circuit 101 coupled with the terminal devices 2 or the terminal interface devices 4 by way of the two way bidirectional lines, a transmission/reception circuit 102 serving as an input/output port, and a synchronization detector 103 for detecting a synchronization signal contained in the data supplied through the hybrid circuit 101 and the transmission/reception circuit 102.

The demultiplexer 104 responds to a synchronization signal from the synchronization detector 103 to fetch a received signal supplied through the transmission/reception circuit 102. Then, the fetched signal is selectively loaded into registers 105A, 105B and 105C according to the format of the fetched signal. More specifically, these registers 105A, 105B and 105C store a voice signal or synchronous data, asynchronous data and one of control bits for forming control data containing mode data which are included in the received signal. The data stored in the registers 105A and 105B is driven out in response to a clock pulse of 2 Mbits/s generated from the central control device 12, and sent into the PCM highway 15 within a predetermined time slot, through the multiplexer 106. At this time, the multiplexer 106 operates in accordance with a control data stored in the register 105C under control of a control circuit made up of a CPU 107-1, a memory 107-2, an I/O unit 107-3, and a counter 107-4. The counter 107-4 is cleared by a frame signal synchronously produced at the leading edge of each frame, and then counts the clock pulse of 2 Mbits/s generated from the central control device 12. For example, the CPU 107-1 compares the contents of the counter 107-4 with transmission time slot data, which together with a proper address data is sent from the central control device 12. When the time slot specified by the transmission time slot data is coincident with the time slot specified by the contents of the counter 107-4, the CPU 107-1 controls the multiplexer 106 according to the contents of the mode data, thereby allowing the contents of the registers 105A and 105B to be transferred to the PCM highway 15.

Under control of the control data supplied through the control highway 13, the central control device 12 supplies through an I/O unit 107-3 to the CPU 107-1 address data for specifying a destination interface circuit and the received time slot data for specifying a time slot. Additionally, the central control device 12 supplies time slot conversion data to the PCM switching circuit 14, to cause the PCM switching circuit 14 to send signal data in an altered time slot to the PCM highway 15.

As in the previous manner, the CPU 107-1 in the specified interface circuit compares the received time slot data, which together with the address data is sent from the central control device 12 through the I/O unit 107-3, with the contents of the counter 107-4. When the received time slot data is coincident with the contents of the I/O unit 107-3, it controls the demultiplexer 108 to selectively send to the registers 110A and 110B the signal data supplied through the PCM highway 15. These registers 110A and 110B, when driven by the clock pulse for 2 Mbits/s, store, for example, the voice data D1 and the asynchronous data D2 supplied through the demultiplexer 108. The CPU 107-1 stores into the register 110C the control data input through the I/O unit 107-3. The data stored in those registers 110A, 110B and 110C are rearranged into a predetermined format, and then the data of this format is supplied into, for example, the selected one of the terminal interface devices 4, through the transmission/reception circuit 102 and the hybrid circuit 101.

Now the operation of the exchange system thus far explained referring to FIGS. 1, 3 and 4 is explained.

FIG. 5A shows a format of the data transmitted every burst through the two way bidirectional transmission system between the digital interface circuit 10 and the terminal device 2 or the terminal interface device 4. As shown, the data of one burst of 13 bits, for example, contains a 1-bit frame signal F, 8-bit data D1 representing a digitized voice signal or a synchronous terminal data, 2-bit data D2 representative of asynchronous terminal data, a 1-bit control signal C and a 1-bit parity signal P.

The control data for controlling the transmission and reception of signal is composed of 12 bits, as shown in FIG. 5B, and each bit is contained in each of the transmission data of 12 bursts, for example.

Let us assume that the terminal interface circuit shown in FIG. 3 is coupled with the terminal device for transmitting and receiving the voice data and the asynchronous data, and the mode data generator MDG is set so as to generate mode data "11". On this assumption, the data selector 43-1 allows the data from the telephone terminal interface 41 and the data terminal interface 42 respectively to be stored into the registers 43-2 and 43-3. Further, it allows the data from the registers 44-2 and 44-3 respectively to be transferred to the telephone terminal interface 41 and the data terminal interface 42. Before effecting this data transfer, the mode data of the mode data generator MDG is stored into the register 105C, through the control data register 43-4, the parity generator 43-6, the NRZ/diphase converter 45, the hybrid circuits 46 and 101, the transmission/reception circuit 102, and the demultiplexer 104.

In response to the drive pulse T1, the signal data derived from the interfaces 41 and 42 are stored into the registers 43-2 and 43-3, respectively, and the control data is stored into the register 43-4 by the CPU 54. The signal data stored in those registers 43-2 and 43-3 and one of the control bits stored in the control data register 43-4 are transferred to the multiplexer 43-5. The multiplexer 43-5 feeds to the parity generator 43-6 the data from the registers 43-2 to 43-4 and the frame bit F as well. The parity generator 43-6 prepares a parity bit on the basis of the data from the parity generator 43-6, and attaches this parity bit to the data from the parity generator 43-6 to form the format shown in FIG. 5. The data of this format is then supplied to the NRZ/diphase converter 45. The NRZ/diphase converter 45 converts the NRZ signal from the parity generator 43-6 into a diphase signal and then transfers the diphase signal into the digital interface circuits 10, via the hybrid circuit 46.

The data from the terminal interface devices 4 is supplied to the transmission/reception circuit 102 through the hybrid circuit 101. The transmission/reception circuit 102 transfers the received data to the synchronization detector 103 and the demultiplexer 104. Upon detection of a frame bit contained in the data derived from the transmission/reception circuit 102, the synchronization detector 103 generates a synchronization pulse. In response to this synchronization pulse, the demultiplexer 104 transfers the voice data D1, the asynchronous data D2, and the control bit C derived from the transmission/reception circuit 102 respectively into the registers 105A, 105B and 105C.

The voice data D1 and the asynchronous data D2 from the registers 105A and 105B are multiplexed by the multiplexer 106, and the multiplexted one is then transferred via the PCM highway 15 into the PCM switching circuit 14 where it is temporarily stored.

In this way, the data of one burst is supplied from the terminal devices 3 to the PCM exchange 1, through the terminal interface devices 4. Subsequently, the data is transmitted every burst from the terminal device 3 to the PCM exchange 1. When a total of 12 bursts data are transmitted to the PCM exchange 1, the register 105C stores 12-bit control data, the control data consists of the information signal representative of, for example, a call signal, a dial signal, a key signal, an acknowledge signal, a call progress signal, or a release signal, and additionally mode data of 2 bits.

The CPU 107-1 supplies the control data stored in the register 105C into the central control device 12, by way of the I/O unit 107-3 and the control highway 13. The central control device 12 controls the PCM switching circuit 14 according to the mode data and a destination signal, e.g. a dial signal, contained in the received controlled data, thereby to set up the number of time slots for the PCM highway 15 depending on the mode data. At the same time, it takes the timing of each of the time slots to be assigned according to the destination signal. In this example, the mode data is set at "11", and then two time slots are assigned to the PCM highway 15. Specifically, at the timing corresponding to the destination signal, the central control device 12 fetches from the PCM switching circuit 14 the voice data D1 and the asynchronous data D2, which have been temporarily stored in the PCM switching circuit 14. The fetched data are sent to the two time slots of the PCM highway 15. The assignment of the time slots is performed in a manner that one or two time slots are assigned to the PCM highway 15 according to the mode data, as shown in the following table.

| MODE | Contents of register 105A | Contents of register 105B | Number of Time slots |
| --- | --- | --- | --- |
| 00 | Empty | Asynchronous data | 1 |
| 01 | Synchronous data | Empty | 1 |
| 10 | Voice | Empty | 1 |
| 11 | Voice | Asynchronous data | 2 |

As seen from the above table, when the mode data is "00", the asynchronous data is stored into the register 105B. When it is "01", the synchronous data is stord the register 105A. When it is "01", the central control device 12 assigns one time slot to the PCM highway 15. When the mode data is "00", the CPU 107-1 sets the multiplexer 106 to a first state and allows the contents of the register 105B to be sent via the multiplexer 106 to the PCM highway 15. When the mode data is "01" or "10", the multiplexer 106 is set in a second state, and the contents of the register 105A is transferred via the multiplexer 106 to the PCM highway 15. Further, when the mode data is "11", the voice data is stored in the register 105A, and the asynchronous data is stored in the register 105B. In this case, the central control device 12 assigns two time slots to the PCM highway 15. Within these time slots, the voice data or the asynchronous data in the registers 105A and 105B are sent to the PCM highway 15 through the multiplexer 106.

In this way, the signal data set to the PCM highway 15 within the time slots, under control of the central control device 12, is supplied via the PCM switching circuit 14 to one of the digital interface circuits 10 which is coupled with the destination terminal device. At the same time, the control data on the control highway 13 is supplied to the CPU 107-1, through the I/O unit 107-3 in the sepecified interface circuit. The CPU 107-1 controls the demultiplexer 108 to selectively store the data D1 and D2 coming through the PCM highway 15 to the registers 110A and 110B, and at the same time stores in the register 110C the 12-bit control data coming through the control highway 13. The 12-bit control data contains, for example, a calling signal, a disconnection signal, a dial permit signal, a communication possible signal, a called party busy signal, an invalid request signal, or a void signal.

The multiplexer 111 sets up the data format as shown in FIG. 5A by using the data D1 and D2, and the control bit C stored in the registers 110A, 110B and 110C, and transmits the data of this format through the transmission/reception circuit 102 and the hybrid circuit 101 to the specified terminal interface device 4 or the terminal devices 2.

In this way, the data is transmitted from the PCM exchange 1 through the hybrid circuit 46 to the diphase/NRZ converter 47. In the diphase/NRZ converter 47, the data is converted into an NRZ signal and then is transmitted to the frame detector 50 and the demultiplexer 44-1, via the window gate circuit 49. The frame detector 50 produces a synchronization signal when receiving a frame signal contained in the NRZ signal fed through the window gate circuit 49, and supplies it to the clock generator 51. In response to the received synchronization pulse, a clock pulse generated from the clock generator 51 is made in synchronism with the synchronization pulse from the frame detector 50. The demultiplexer 44-1 stores to the registers 44-2 to 44-4 the data D1 and D2 and the control bit C contained in the NRZ signal supplied through the window gate circuit 49. The CPU 54 selectively applies the data of the registers 44-2 and 44-3 to the telephone terminal interface 41 and the data terminal interface 42, through the data selector 43-1 controlled by the mode data derived from the mode data generator MDG.

The terminal interface devices 4-1, ..., 4-4, ... and the digital interface circuits 10-1, ..., 104, ... are interconnected as shown in FIG. 6. A transmission frame TF and a reception frame RF transmitted through the PCM highway 15 are as shown in FIGS. 7A and 7B. In FIG. 6, an asychronous type terminal interface circuit 4-1 is connected to a digital interface circuit 10-1. A voice/asynchronous type terminal interface device 4-2 is connected to a digital interface circuit 10-2. A synchronous terminal interface device 4-3 is connected to a digital interface circuit 10-3. A voice terminal interface device 4-4 is connected to a digital interface circuit 10-4. With this connection arrangement, the mode data generators MDG in the interface devices 4-1 to 4-4 produce respectively mode data "00", "11", "01" and "10". The central control device 12 assigns time slots to the related communication path according to the mode data. For example, when the terminal interface device 4-1 sends and receives data, a first transmission time slot TTS1 and a first receiving time slot RTS1 are assigned to the communication path. Second and third transmission time slots TTS2 and TTS3, and second and third receiving time slots RTS2 and RTS3 are assigned, when the terminal interface device 4-2 receives and transmits data. A fourth transmission time slot TTS4 and a fourth reception time slot RTS4 are assigned when the terminal interface device 4-3 is in the data transmission/reception mode. A fifth transmission time slot TTS5 and a fifth reception time slot RTS5 are assigned when the terminal interface device 4-4 is in the data transmission/reception mode.

In this way, the time slots to be assigned may continuously be set to a plurality of terminal interface devices, with no void time slots. This implies that the time slots assigned to the PCM highway 15 may be used effectively.

In FIG. 6, it is assumed that a voice/asychronous terminal interface device is used in place of the terminal interface device 4-1. In this case, the mode data generator MDG in this terminal interface device is set so as to produce mode data "11". When the terminal interface device is in the data transmission/reception mode, the central control device 12 assigns, for example, first and Nth tansmission time slots TTS1 and TTSN, and first and Nth receiption time slots RTS1 and RTSN for the data transmission line. For the remaining terminal interface devices 4-2 to 4-4, no alteration is required for the assignment of the time slots.

Thus, if the terminal interface device is changed, the assignment of the time slots may easily and effectively be executed.

It should be understood that the present invention is not limited to the above-mentioned specific embodiment, but may variously be changed and altered within the scope of the invention.

In the interface circuit of FIG. 4, the operation of the multiplexer 106 and the demultiplexer 108 are under control of the CPU 107-1. Alternately, the same control may be effected by a combination of an address register for storing address data coming through the I/O unit 107-3, a comparator for comparing the contents of the address register with the contents of the counter 107-4, and a control circuit for controlling the operation of the multiplexer 106 and the demultiplexer 108 according to the output signal from the comparator and the mode data.

What is claimed is:
1. An exchange system comprising:
a plurality of interface means;
a plurality of terminal means coupled with the plurality of said interface means and for transmitting signal data and control data in a predetermined format between said interface means and said terminal means;
a control highway connected to said plurality of interface means for transmitting said control data;
a PCM highway connected to said plurality of interface means for transmitting said signal data; and
control means connected to said control and PCM highways for assigning to said PCM highway a time slot with a length determined by mode data supplied from one of said interface means and transmitted through said control highway, in order to transmit signal data from one of said terminal means, and for transmitting within the time slot thus assigned the data part which is specified by said mode data and which is included in the signal data with said predetermined format, through said PCM highway to one of said interface means which is selected according to the control data;
wherein each of said interface means includes a mode data generator, which is capable of selectively generating one of a plurality of mode data representing the type of signal data to be transmitted by said interface means, for generating the selected of the plurality of mode data.

2. The exchange system according to claim 1, wherein said mode data generator (MCG) comprises means for generating 2-bit mode data representing the type of said interface means.

3. The exchange system according to claim 2, wherein said control means selectively assigns one or two time slots to said PCM highway according to the mode data from said mode data generator.

* * * * *